United States Patent
Bonis et al.

(10) Patent No.: US 6,627,318 B2
(45) Date of Patent: Sep. 30, 2003

(54) AUTOMOTIVE ULTRAVIOLET PROTECTION

(76) Inventors: Andrea C. Bonis, 684 Newton St., Chestnut Hill, MA (US) 02467; George E. Kersey, P.O. Box 2006, Salem, NH (US) 03079; Laszlo J. Bonis, 52 Haven St., Dover, MA (US) 02030

( * ) Notice: Subject to any disclaimer, the term of this patent is extended or adjusted under 35 U.S.C. 154(b) by 84 days.

(21) Appl. No.: 10/012,843

(22) Filed: Nov. 10, 2001

(65) Prior Publication Data

US 2003/0091836 A1 May 15, 2003

(51) Int. Cl.⁷ .................. B32B 17/10; B32B 27/30; B32B 27/42
(52) U.S. Cl. .............. 428/437; 428/441; 428/500; 428/521; 428/524
(58) Field of Search ................. 428/437, 500, 428/521, 441, 524; 525/232, 227, 241

(56) References Cited

U.S. PATENT DOCUMENTS 4,251,591 A * 2/1981 Chi ................ 428/316.6
5,572,091 A * 11/1996 Langer et al. .......... 313/636

* cited by examiner

Primary Examiner—Ramsey Zacharia

(57) ABSTRACT

Light-transmittive medium permitting unimpeded visual radiation while simultaneously serving as a protective shield against ultraviolet radiation by employing a conjugated double-bond polymer as an interlayer for glass or mixing in glass a salt that absorbs ultraviolet radiation.

15 Claims, No Drawings

AUTOMOTIVE ULTRAVIOLET PROTECTION

BACKGROUND OF THE INVENTION

This invention relates to the protection of vehicular occupants against harmful radiation, and more particularly, to the protection of automobile occupants against harmful ultraviolet radiation.

Ultraviolet radiation, especially in the A, B and C bands, can be harmful to animals, including humans. In order to protect against this kind of radiation, it is necessary to limit the amount of glass surface commonly found in automotive vehicles. At the same time, it is desirable to expand the glass surface in order to promote visibility.

Accordingly, it is an object of the invention to provide protection against the exposure of automotive occupants to harmful radiation while simultaneously not interfering with the desire to increase the amount of light transmittive surface in order to promote automotive visibility.

There have been numerous attempts to provide ultraviolet protection. An illustrative example is provided by U.S. Pat. No. 6,235,271, which issued to Luther et al., on May 22, 2001. Luther et al. disclose a sunprotection agent, which is especially suitable for use in pharmaceutical or cosmetic applications, containing a micronized organic UV absorber, and a non-micronized UV absorber and/or an inorganic-micropigment, together with a polymeric hollow sphere additive and/or xanthan and/or polyvinylpyrrolidone.

Another preparation for ultraviolet protection is set forth in U.S. Pat. No. 4,804,531 which issued to Grollier on Feb. 14, 1989. Grollier discloses a cosmetic screening composition containing a UV screen in combination with a polymer obtained by block polymerization in emulsion and its use for the protection of the human epidermis against ultraviolet radiations.

Still another composition for UV protection is provided by U.S. Pat. No. 4,524,061, which issued to Cho et al. on Jun. 18, 1985. This patent is directed to a polymeric sunscreen agent of interpolymers including an olefinic p-aminobenzoate devoid of hydroxy substitution, N-vinylpyrrolidone, and at least a vinyl lactam monomer.

There also have been numerous attempts to provide ultraviolet protection for glass, but none of these achieve the advantages and simplicity of the invention. The prior art includes the following patents: U.S. Pat. No. 6,220,059, "Method of Coating a UV-fiber With Blocking Layers and Charging the Fiber With Hydrogen Or Deuterium"; U.S. No. 6,159,608, "Thermoplastic Interlayer Film"; U.S. Pat. No. 6,143,417, "Contamination-Resistant Float Glass"; U.S. Pat. No. 6,138,663, "Cooking Apparatus Containing A Window That Is A Contamination-Resistant Float Glass"; U.S. Pat. No. 6,122,093, "Reduced Ultraviolet Radiation Transmitting, Safety Protected Electrochromic Glazing Assembly"; U.S. Pat. No. 6,121,354, "High Performance Single-Component Sealant"; U.S. Pat. No. 6,117,497, "Solid Surface Modification Method and Apparatus", U.S. Pat. No. 6,022,624, "Partially Crystallizing Lead-Free Enamel Composition for Automobile Glass"; U.S. No. 5,986,797, "Reduced Ultraviolet Radiation Transmitting, Safety Protected Electrochromic Glazing Assembly"; U.S. Pat. No. 5,972,565, "Flexographic Printing Forms Having Resistance to UV-Hardenable Printing Inks"; U.S. Pat. No. 5,948,594, "Flexographic Printing Forms for UV-Hardenable Printing Inks"; U.S. Pat. No. 5,925,160, "Partially Crystallizing Lead-Free Enamel Composition For Automobile Glass"; U.S. Pat. No. 5,908,585, "Electrically Conductive Transparent Film And Coating Composition For Forming Such Film"; U.S. Pat. No. 5,864,419, "Near-Infrared Reflecting, Ultraviolet Protected, Safety Protected, Electrochromic Vehicular Glazing", U.S. Pat. No. 5,846,279, "Process for Producing A Contamination-Resistant Float Glass"; U.S. Pat. No. 5,792,560, "Thermoplastic Interlayer Film"; U.S. Pat. No. 5,783,507, "Partially Crystallizing Lead-Free Enamel Composition For Automobile Glass"; U.S. Pat. No. 5,680,245, "Reduced Ultraviolet Radiation Transmitting, Electrochromic Assembly"; U.S. Pat. No. 5,641,716, "Glass Production Method Using Ilmenite"; U.S. No. 5,629,365, "UV-Absorbing Polymer Latex"; U.S. Pat. No. 5,610,108, "Reducing Melt Borosilicate Glass Having Improved UV Transmission Properties And Water Resistance And Method of Use"; U.S. Pat. No. 5,578,378, "Anti-Fogging Coating Composition, Product Coated With Said Composition And Method for Preparation of Said Product"; U.S. Pat. No. 5,547,904, "Borosilicate Glass Having Improved UV Transmission, Thermal and Chemical Properties and Method of Making and Using Same"; U.S. Pat. No. 5,523,877, "Reduced Near-Infrared Radiation Transmitting Ultraviolet Protected, Safety Protected Electrochromic Vehicular Glazing"; U.S. Pat. No. 5,523,263, "Glass Production Method Using Ilmenite"; U.S. Pat. No. 5,480,722, "Ultraviolet Ray Absorbent Glass and Method For Preparing the Same"; U.S. Pat. No. 5,385,872, "Ultraviolet Absorbing Green Tinted Glass"; U.S. Pat. No. 5,364,433, "Optical Member of Synthetic Quartz Glass For Excimer Lasers and Methods For Producing Same"; U.S. Pat. No. 5,355,245, "Ultraviolet Protected Electrochemichromic Rearview Mirror"; U.S. Pat. No. 5,249,076, "Optical Filter Structure"; U.S. No. 5,240,886, "Ultraviolet Absorbing, Green Tinted Glass"; U.S. Pat. No. 5,239,406, "Near-Infrared Reflecting, Ultraviolet Protected, Safety Protected, Electrochromic Vehicular Glazing"; U.S. Pat. No. 5,214,008, "High visible, Low UV and Low IR Transmittance Green Glass Composition"; U.S. Pat. No. 3,115,346, "anti-Scatter, Ultraviolet Protected, Anti-Misting, Electro-Optical Rearview Mirror; U.S. Pat. No. 5,098,948, "Water-Based Protective Compositions for Coating Films and Preparation Processes Thereof"; U.S. Pat. No. 5,077,133, "Infrared And Ultraviolet Radiation Absorbing Green Glass Composition"; U.S. Pat. No. 5,045,509, "UV-Transparent Glass"; U.S. Pat. No. 4,792,536, "Transparent Infrared Absorbing Glass And Method of Making"; U.S. Pat. No. 4,649,062, "Ultraviolet Radiation Curable Vehicle For Ceramic Colors, Composition and Method"; U.S. Pat. No. 4,326,214, "Thermal Shock Resistant Package Having an Ultraviolet Light Transmitting Window For a Semiconductor Chip".

SUMMARY OF THE INVENTION

In accomplishing the foregoing and related objects, the invention provides a light-transmissive surface which permits unimpeded visual radiation, but simultaneously serves as a protective shield against ultraviolet (UV) radiation, particularly in the UV-A, UV-B and UV-C bands.

The invention functions by absorbing the UV portion of radiation below 315 nanometers ("nm") of the A, B and C bands, and provides a method for the manufacture of such a light transmissive surface, as well as for the use of such surface as automotive glass.

The light-transmissive medium of the invention includes means for permitting unimpeded visual radiation, and means included for simultaneously serving as a protective shield against ultraviolet radiation.

The light-transmissive medium can include a conjugated double-bond polymer, selected from the class consisting of alkenes and arenes.

The light-transmissive medium can include the conjugated double-bond polymer in another polymeric material comprising an interlayer for glass, such as polyvinyl butyral.

In a method of the invention for providing a light-transmissive surface, the steps include (a) providing a medium that shields ultraviolet radiation; (b) combining the medium with a substance that provides general radiation transmission. The medium can be mixed with the substance and be selected from the class of conjugated multiple-bond polymers.

In the method, the medium can be a salt that absorbs UV radiation, such as cerium aluminate.

In a method of the invention for providing a light-transmissive material, the steps include (a) providing a substance that shields ultraviolet radiation; (b) providing a substance that is generally radiation transmissive; and (c) combining the substances of steps (a) and (b).

The method further includes the step of casting the combined substances into a specified shape, such as automotive glass.

In the method, the substance that shields ultraviolet radiation can have conjugate, multiple bonds selected from the class consisting of alkenes and arenes.

In an apparatus for protecting against harmful radiation, the apparatus can have an interior which is subject to radiation exposure and include a material for limiting the extent to which harmful components of radiation can penetrate the interior.

The apparatus can be an automobile with glass paneling which has been modified to curtail the transmission of ultraviolet radiation.

In accordance with one aspect of the invention, the light transmissive medium, such as glass is mixed, for example, by combination with a material that inhibits UV transmission while simultaneously permitting unimpeded transmission of the ordinary visual components.

DETAILED DESCRIPTION

The combination of substances in accordance with invention is achieved in a variety of ways. In one technique of the invention, the combination is by mixing with a compound containing cerium. Advantageously, the cerium is present between about 0.065% and 3.25%, by weight, and preferably between about 0.065% and 1.3%, by weight, in relation to the overall weight of the light transmissive medium, such as glass.

Since glass is a super-cooled fluid, the desired combination may be achieved by dissolving cerium aluminate into the molten glass. When a multivalent alkene, desirably containing between 2 and 5 alternate double-bonds, is used for UV absorbtion, it is necessary to include the absorbant in a plastic material which is adherable to glass.

Illustratively, the plastic material is polyvinyl acetal. These are vinyl resins resulting from the condensation of polyvinyl alcohol with an aldeyhde; acetal dehyde, formaldehyde and butyral dehyde. Other vinyl resins include: polyvinyl formal and polyvinyl butyral. These are thermoplastic materials produced by extrusion, molding and casting.

In accordance with a feature of the invention, when a salt is used as the UV absorbant, only a single melting step need be employed by melting together sand, or other suitable material for the production of glass, and the mixing or doping substance, such as cerium aluminate.

Preferably the cerium aluminate is in powder form, and is homogeneously mixed with the sand. The grain size of the cerium-aluminate powder advantageously is on the order of 20 millimicrons (".mu.m"), or less.

The cerium-aluminate powder can be produced from an initial mixture of cerium oxide ("$CeO_2$") and aluminum oxide ("$Al_2O_3$"), heated to glowing temperature when solid. The mole-relationship of the aluminum oxide and cerium oxide in initial mixture, preferably is 0.5:1.

By weight, the quantity of cerium aluminate, with respect to the sand is on the order of about 5%, preferably between 0.1% and 2%. Titanium oxide ("$TiO_2$"), can be added as a further doping compound and homogeneously mixed into the sand.

In general the dopant is a lanthanide-metallic salt, in which the lantahnide metal cerium can be replaced by Praesodymium (Pr), Neodymium (Nd), Promethium (Pm), Samarium (SM), Europium (Eu), Gadolinium (Gd), Terbium (Tb), Dyusprosium (DY), Holminium (HO), Erbium (Er), Thulium (Tm), Ytterbium (Yb), or Lutetium (Lu). The metal aluminum can be replaced by Gallium (Ga), Indium (In), or Thalium (TH).

In accordance with another aspect of the invention, a polyunsaturated polymer with conjugate multiple bonds is employed. Illustratively, there can be three double bonds. The electrons in the lower band jump to a higher level as a result of the absorption of ultraviolet light.

The absorption of UV is in accordance with the chain length of the polymer when it is an alkene with conjugate double bonds (alkene-cdb), or alkadiene. Thus, butene-cdb, or butadiene, as illustrated by equation (1), below, has a four-carbon chain and is particularly useful for the absorption of UV-A.

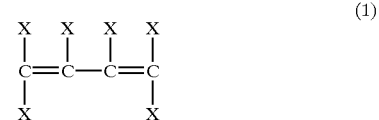

(1)

in which X is hydrogen (H) or a radical, such a methyl (—CH3).

The term "conjugate double bond" refers to the alternating presence of double bonds in the chain structure.

For the absorption of UV-B, a suitable alkene-cdb, or alkadiene, is pentene-cdb, or pentadiene, which is illustrated by equation (2a) below.

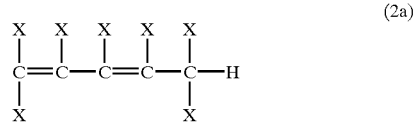

(2a)

in which X is hydrogen (H) or a radical, such a methyl (—CH3).

Alternatively, the pentadiene can take the form illustrated by (2b) below.

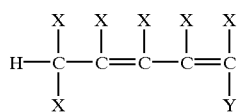

in which X is hydrogen (H) or a radical, such a methyl (—CH3), and Y is a radical, different than X.

The pentadienes of equations (2a) and (2b) can have different properties depending upon the radical attached to the first carbon. When the radicals are different, the resulting polymers are isomers.

Similarly, for the absorption of UV-C, a suitable alkadiene is hexadiene, which is illustrated by equation (3) below in which the attached hydrogens are similar to those shown above for equations (1), (2a) and (2b).

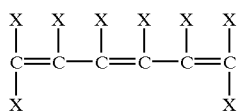

In accordance with a further aspect of the invention, the polymer can be an alkyne, which is one of a class of unsaturated hydrocarbons of the homologous series having the generic formula $C(n)H(2n-2)$. As with the alkadienes, the shorter chains are used for the absorption of longer wave length UV and the longer chains are for the higher wave length UV.

Conjugate double bonds of use in the practice of the invention are also to be found in the arenes which are unsaturated cyclic hydrocarbons containing one or more rings. A typical arene is benzene which has a six-carbon ring with three conjugate double bonds.

The invention employs conjugate bonds to absorb ultraviolet radiation, and for low molecular weights is colorless.

The foregoing examples are merely illustrative and other materials and methods will occur to those of ordinary skill in the art.

What is claimed:

1. A light-transmittive medium comprising:
means for permitting unimpeded visual radiation, and
means included with the permitting means for simultaneously serving as a protective shield against ultraviolet (UV) radiation;
wherein said light-transmittive medium includes a conjugated double-bond polymer included in another polymeric material comprising an interlayer for glass and said polymeric material is polyvinyl butyral.

2. A light-transmittive medium as defined in claim 1 serving as a protective shield against at least one of the UV-A, UV-B and UV-C bands.

3. A light-transmittive medium as defined in claim 1 which absorbs UV radiation below 315 nanometers ("nm").

4. A light-transmittive medium as defined in claim 1 wherein said conjugated double-bond polymer is selected from the group consisting of polymers containing alkene structures.

5. A light-transmittive medium as defined in claim 1 wherein said conjugated double-bond polymer is selected from the group consisting of polymers containing aryl structures.

6. A method of providing a light-transmittive surface which comprises the steps of
(a) providing a medium that shields ultraviolet radiation;
(b) combining said medium with a substance that provides general radiation transmission;
wherein the light-transmittive medium comprises an interlayer for glass that is a blend of a conjugated multiple-bond polymer and polyvinyl butyral.

7. The method of claim 6 wherein said medium is selected from the group consisting of conjugated double-bond polymers.

8. The method of claim 6 wherein said glass contains a salt that absorbs UV radiation.

9. The method of claim 8 wherein said salt is cerium aluminate.

10. A method of providing a light-transmittive material which comprises the steps of
(a) providing a substance that shields ultraviolet radiation in the form of an interlayer that is a blend of a conjugated multiple-bond polymer and polyvinyl butyral;
(b) providing a substance that is generally radiation transmissive; and
(c) combining the substances of steps (a) and (b).

11. The method of claim 10 further including the step of casting the combined substances into a specified shape.

12. The method of claim 11 wherein the combined substances are cast into the shape of automotive glass.

13. The method of claim 10 wherein the substance that shields ultraviolet radiation has conjugate, double bonds selected from the group consisting of polymers containing alkene and arene structures.

14. Apparatus for protecting against harmful radiation comprising a device having an interior which is subject to radiation exposure and means for limiting the extent to which harmful components of said radiation can penetrate said interior comprising an interlayer for glass that is a blend of a conjugated double-bond polymer and polyvinyl butyral.

15. Apparatus as defined in claim 14 wherein the device is an automobile and the limiting means comprises glass paneling which has been modified to curtail the transmission of ultraviolet radiation.

* * * * *